Figure 6:
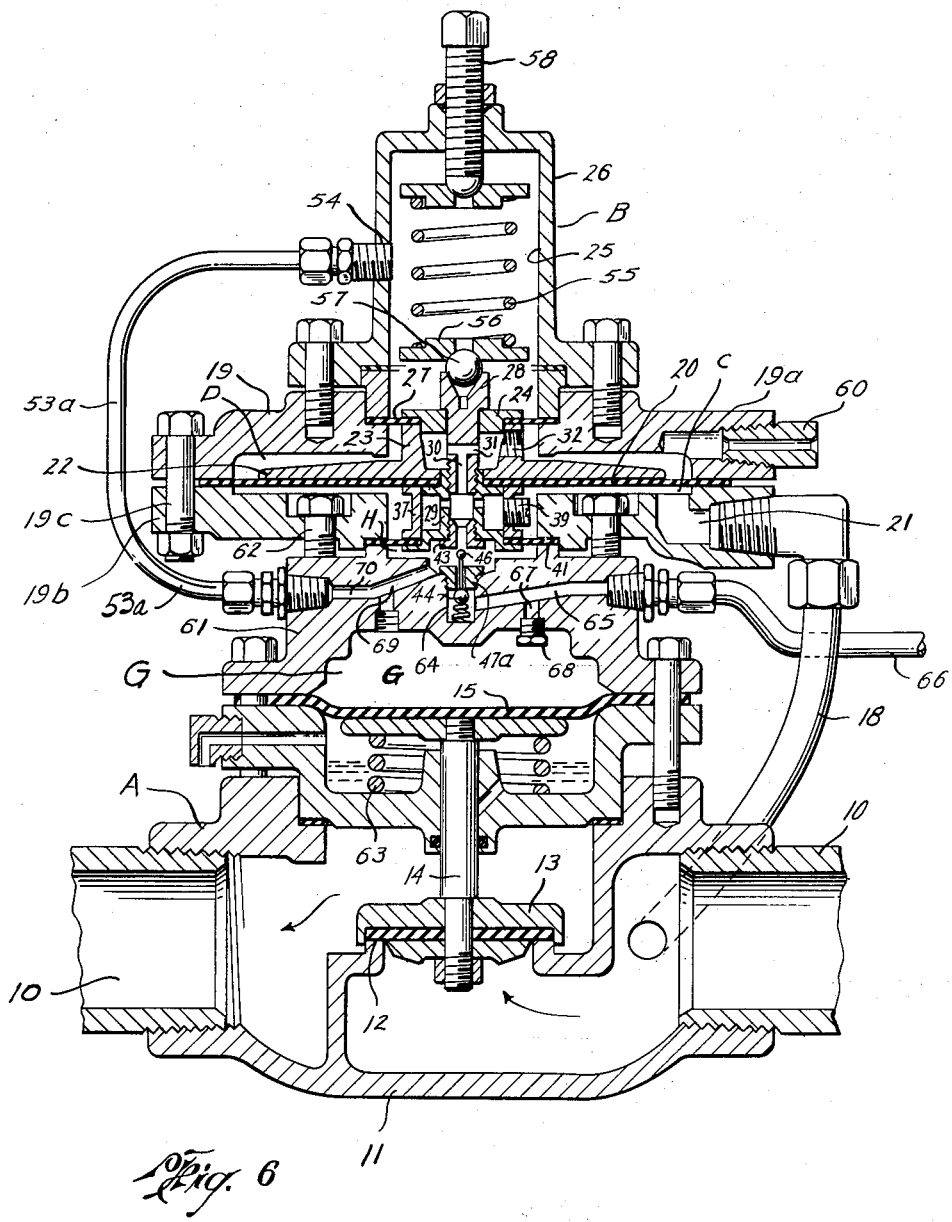

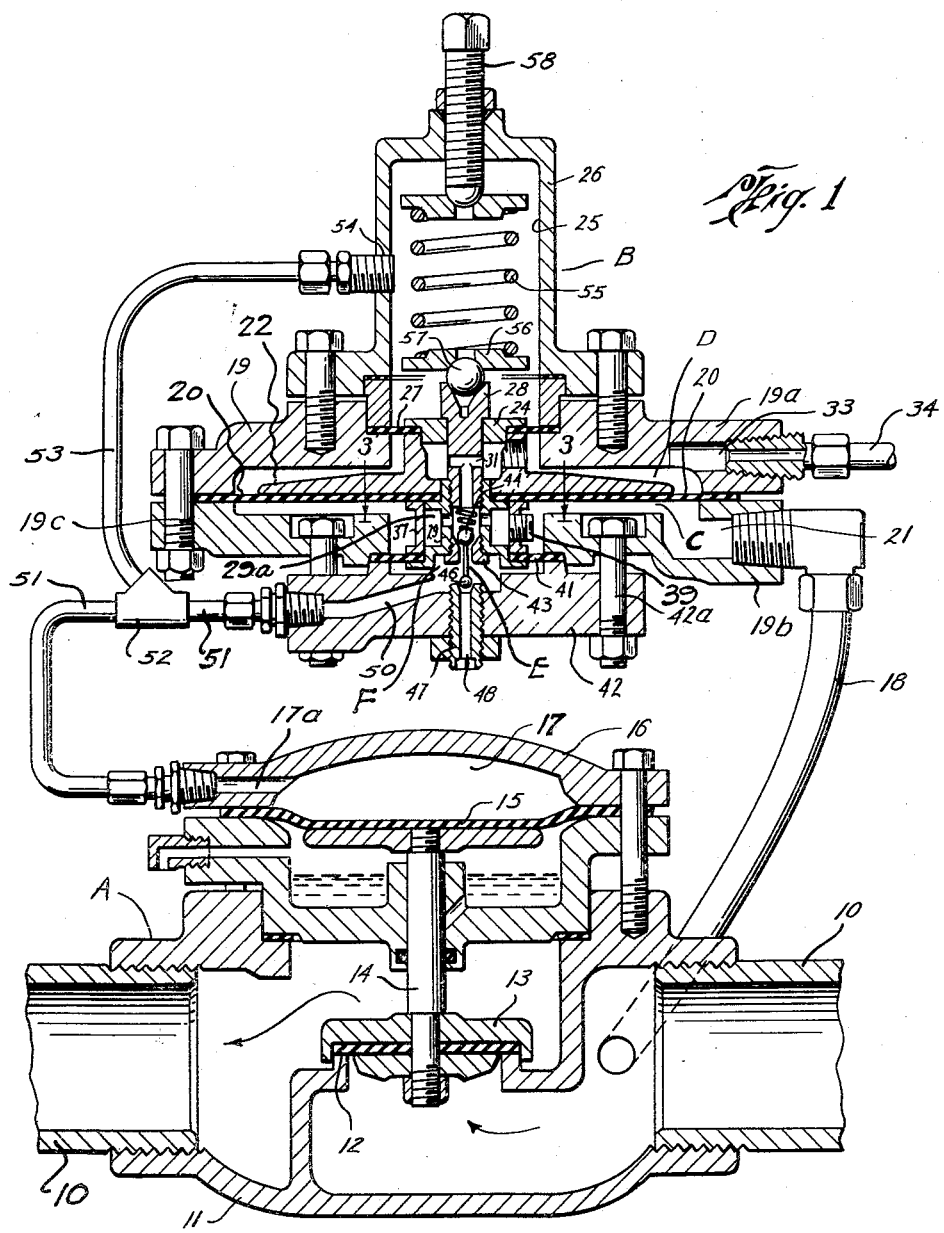

Feb. 28, 1956  A. S. PARKS ET AL  2,736,337
REGULATOR DEVICES AND CONTROL ASSEMBLIES THEREFOR
Filed May 7, 1951  4 Sheets-Sheet 2
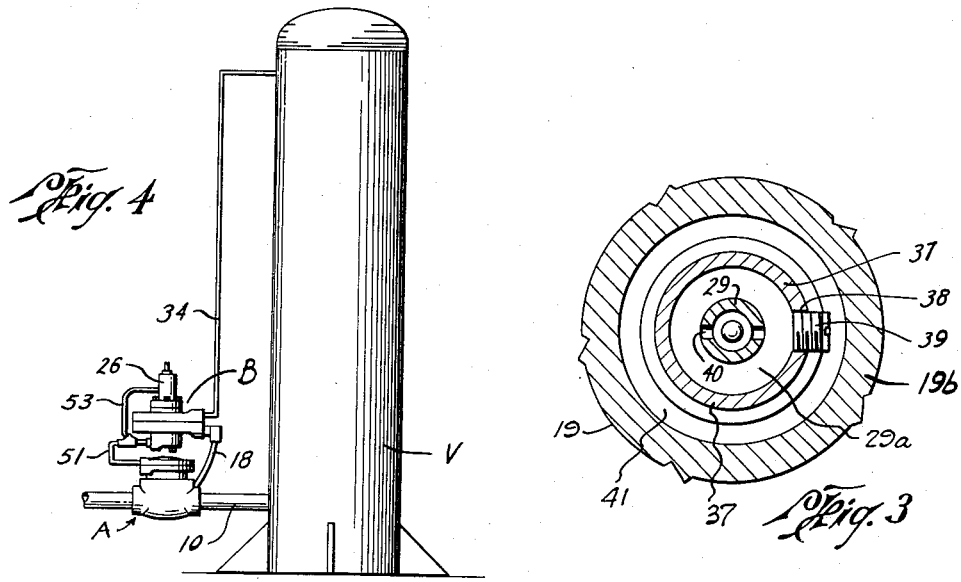
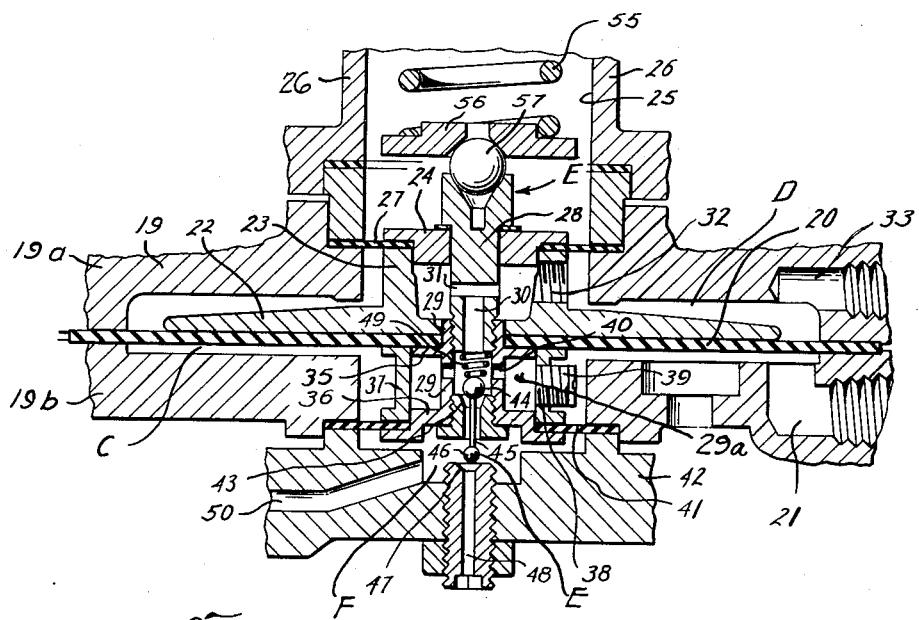
Asbury S. Parks
Garman O. Kimmell
INVENTORS
ATTORNEYS Asbury S. Parks
Garman O. Kimmell
INVENTORS Feb. 28, 1956  A. S. PARKS ET AL  2,736,337
REGULATOR DEVICES AND CONTROL ASSEMBLIES THEREFOR
Filed May 7, 1951  4 Sheets-Sheet 4
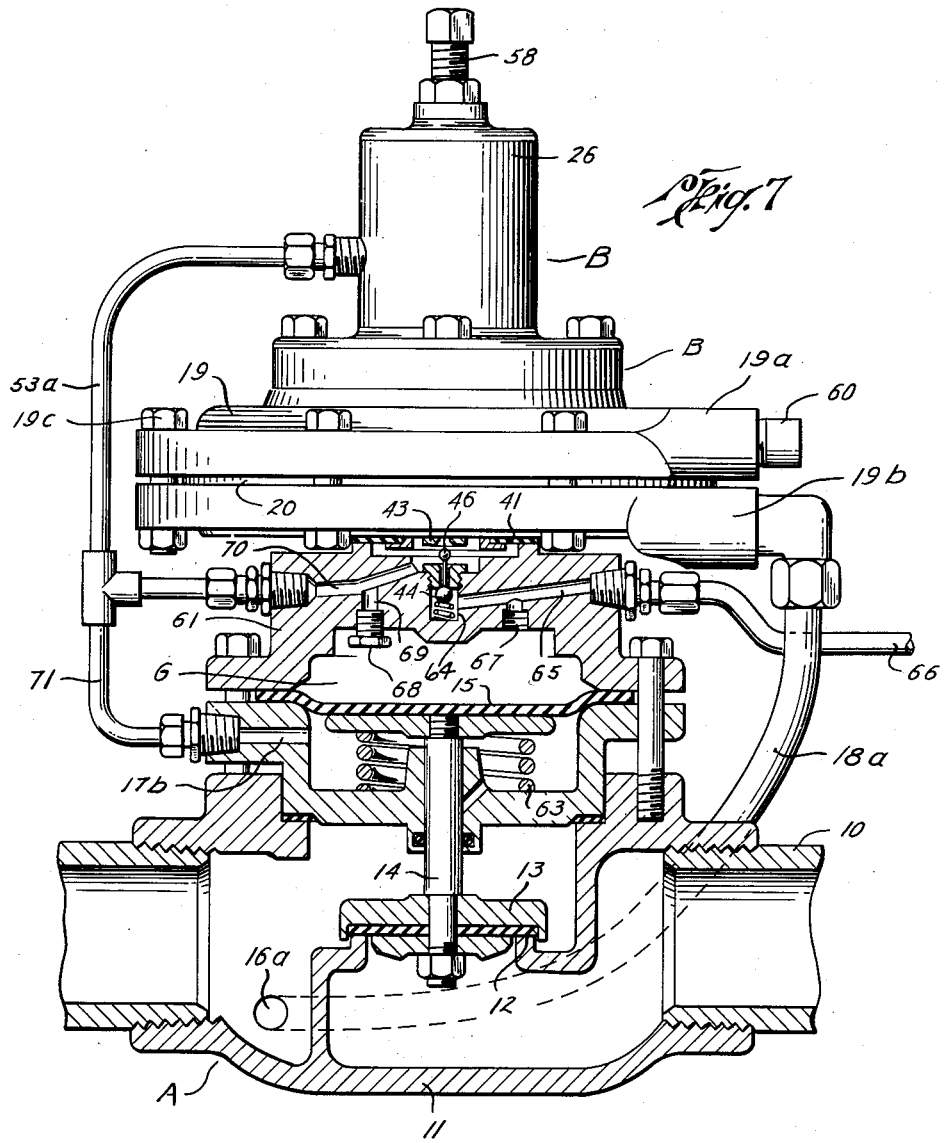
Asbury S. Parks
Garman O. Kimmell
INVENTORS
BY J. Vincent Martin
and
Joel E. Edwards
ATTORNEYS

United States Patent Office 2,736,337
Patented Feb. 28, 1956

2,736,337

REGULATOR DEVICES AND CONTROL ASSEMBLIES THEREFOR

Asbury S. Parks, Houston, Tex., and Garman O. Kimmell, Britton, Okla.; said Parks assignor to said Kimmell Application May 7, 1951, Serial No. 224,996

10 Claims. (Cl. 137—492.5)

This invention relates to new and useful improvements in regulator devices and control assemblies therefor.

One object of the invention is to provide an improved pressure regulator device which is constructed to accurately and efficiently control the pressure in a conductor line and which is so arranged that it may be adapted for use as a back-pressure, pressure reducing or other regulating device or as a liquid level control device for controlling the liquid level in a pressure vessel.

An important object of the invention is to provide a regulator device which is controlled in its operation solely by the differential between a known or predetermined pressure and the pressure being controlled, with all other factors which might effect operation being balanced out or nullified, whereby the operation is stabilized, and accurate and sensitive regulation of the controlled pressure is possible.

An important object of the invention is to provide an improved control assembly which lends itself to association with a motor valve device in a manner to produce a back pressure regulator or a pressure reducing regulator or a liquid level control device, whereby said assembly is universally applicable without any major change in its construction for various regulating uses.

A particular object is to provide an improved pilot control assembly for pressure regulating devices wherein the pilot valve unit of said assembly is connected with and movable by a pressure-actuated element and wherein stabilizing means is associated with the valve unit to stabilize and dampen its operation to assure accurate and sensitive control and prevent "hunting" when the assembly is operated as a throttling control device.

Another object is to provide a pilot control assembly, of the character described, wherein adjustable means is incorporated in the pilot valve unit to readily compensate for variations in the manufactured parts of the stabilizing means or other variables, whereby sensitive and accurate operation of the assembly is assured.

Another object is to provide a control assembly wherein a seal around the movable valve unit of the assembly is effected by flexible stabilizing elements, such as diaphragms, whereby frictional resistance to movement of the valve unit is minimized; the flexible elements being so arranged that they also function as a stabilizing means which stabilizes the operation of the assembly.

A further object is to provide a control assembly of the character described, having one side of one of the stabilizing elements which seals off around the control valve unit of the assembly exposed to the operating pressure which actuates the main motor valve, together with means for balancing out the effect of this operating pressure acting upon said stabilizing element, whereby the exposure to the operating pressure does not interfere with or affect the operation of the regulator.

Still another object is to provide a control assembly for regulator devices, wherein an auxiliary upper balancing diaphragm having substantially the same cross-sectional area as the lower sealing diaphragm is exposed to the same pressure as said sealing diaphragm through a restricted passage, whereby the upper diaphragm nullifies any effect which the lower diaphragm may have on the valve operation; the restricted passage establishing communication between the diaphragms also permitting said diaphragms to function as a stabilizing means which stabilizes operation of the assembly.

A still further object is to provide a device, of the character described, which has one side of a pressure responsive member constantly exposed to a predetermined pressure with its opposite side exposed to a variable pressure; said pressure responsive member functioning to control a modulated or operating pressure which, in turn, controls a main valve in the pressure line, which valve is acted upon by line pressure, whereby said line pressure is utilized to assist in opening said valve when the modulated or operating pressure is lowered to a predetermined point.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is a transverse, sectional view of an improved control assembly, constructed in accordance with the invention, and showing the same combined with a motor valve for controlling the pressure on the upstream side of the valve, Figure 2 is an enlarged sectional detail of the valve unit of the assembly, Figure 3 is a horizontal cross-sectional view, taken on the line 3—3 of Figure 1, Figure 4 is an elevation of a pressure vessel illustrating the apparatus of Figure 1 applied thereto for controlling the liquid level in said vessel, Figure 5 is a sectional view of a vent plug for use when the device of Figure 4 is employed as a back pressure regulator, Figure 6 is a transverse sectional view of a modified form of the assembly combined with a motor valve, and Figure 7 is a view similar to Figure 5 of still another form of the invention wherein the control assembly is combined with a motor valve to provide a pressure reducing regulator.

In the drawings, the numeral 10 designates a fluid conductor or flow line and the fluid, the pressure of which is to be controlled, is directed therethrough. A main valve A is connected in the conductor or flow line and includes a valve body 11 having a valve seat 12 therein; a valve element 13 is movable with respect to the seat and functions to control flow past said seat. Flow through the valve body is in the direction of the arrows in Figure 1, so that when the valve is in a closed position the under side thereof is exposed to the upstream pressure within the line or conductor, and this upstream pressure constantly acts against the under side of the valve element 13 to urge said valve toward its upper or open position.

The valve element 13 is connected through a stem 14 with an operating diaphragm 15 which is mounted within a suitable diaphragm case 16 bolted to the upper end of the valve body. The area above the operating diaphragm 15 within the case 16 provides a chamber 17 which, as will be explained, is adapted to contain a modulated or controlled pressure which acts upon the upper surface of the diaphragm 15. The cross-sectional area of the diaphragm is larger than the area of the under side of the main valve element 13, and thus a pressure within the chamber 17 which is less than the upstream pressure in the conductor 10 will move the valve to its closed position. The ratio of the area of the operating diaphragm to the area of the valve element will determine the pressure within the chamber 17 required to actuate the valve; the upstream pressure in the conductor is thus utilized to assist in the opening of the main valve element.

For controlling the pressure within the chamber 17 to control operation of the main valve element 13, the improved control assembly generally indicated at B in Figure 1 is provided. This assembly, as will be explained, is adapted to vary the pressure within the operating chamber of the main valve in accordance with variations in the pressure being controlled to thereby actuate the main valve 13 in accordance with such variations. If it is desired to control the upstream pressure, in which case the apparatus would function as a liquid level controller or a back pressure regulator, the assembly A is connected through a line 18 with the conductor 10 on the upstream side of the conductor as shown in Figure 1. If the downstream pressure is to be controlled so that the apparatus will function as a pressure reducing regulator, then the assembly B is connected with the conductor 10 through a line 18a downstream of the valve, as shown in Figure 7.

The pilot pressure, as will be hereinafter explained, is conducted through the control assembly B and then to the chamber 17 and the source of such pilot pressure, as well as its particular point of entry into the assembly B, is varied in accordance with the particular apparatus. Thus, where the device is employed for controlling the liquid level in a pressure vessel the operating pressure may be obtained from said vessel; where the apparatus is employed as either a back pressure or a pressure reducing regulator the pilot operating pressure for the chamber 17 may be any suitable pilot pressure supply and is usually obtained from the flow conductor. The details of connection of the pilot pressure conducting lines will be described in connection with the various modifications of the invention.

In Figures 1 to 4, the apparatus is illustrated as a liquid level controller for controlling the level of a liquid within a pressure vessel. The control assembly B comprises a diaphragm casing 19 consisting of an upper section 19a and a lower section 19b, which sections are connected together by bolts 19c. A control diaphragm 20 spans the interior of the casing and divides said casing into a lower chamber C and an upper chamber D. The lower chamber C has communication through a port 21 with the line 18 extending from the conductor and thus the pressure within the conductor 10 upstream of the valve element 13 is directed into the lower chamber C of the diaphragm case to urge the control diaphragm 20 in an upward direction.

A follower plate 22 having an upstanding collar 23 engages the upper surface of the diaphragm and a flanged closure 24 is secured within the upper end of the collar. These parts are disposed within an axial opening in the upper section of the diaphragm case and said opening is coaxial with the bore 25 of a bonnet 26 which is bolted onto the upper end of the diaphragm case 19. An upper stabilizing diaphragm 27, the purpose of which will be hereinafter described, has its outer periphery clamped between the bonnet and the diaphragm case while its inner periphery is clamped between the collar 23 and the closure 24. It will be evident that the upper stabilizing diaphragm forms the upper end of the upper chamber D within said diaphragm case.

Secured to the control diaphragm 20 and movable therewith is a pilot control valve unit generally indicated at E. The pilot valve unit E includes a cylindrical stem element 28 which extends downwardly through the closure member 24, through the collar 23, and is threaded onto the upper end of a tubular sleeve 29. The lower end of the stem is formed with an axial passage 30 communicating with radial ports 31 and said ports in turn communicate with the interior of the collar 23 and through a threaded opening 32 in said collar with the upper chamber D within the diaphragm case 19. In this manner a communication is established between the passage 30 of the stem 28 and the chamber D; a port 33 extends from the chamber D and may have one end of a pressure inlet line or tube 34 connected therein.

The tubular sleeve 29 to which the stem 28 is connected is formed with an annular flange 35 and when the parts are connected as shown in Figure 2, the control diaphragm 20 is clamped between this flange and the follower plate 22. It will thus be evident that any movement of the control diaphragm 20 will impart a movement to the tubular sleeve 29 and to the stem 28. An offset base flange 36 is formed on the lower end of the tubular sleeve 29 and an annular housing 37 surrounds this offset flange as well as the upper flange 35 to form an annular chamber 29a around the sleeve. The housing is formed with a threaded opening 38 which is closed by a plug 39 and the purpose of this opening will be hereinafter explained. Communication is established between the annular space 29a about the tubular sleeve 29 and the bore of said sleeve through radial openings 40 which extend through the wall of the sleeve.

A lower stablizing diaphragm 41 has its inner peripheral portion clamped between the offset flange 36 and the housing 37 while its outer peripheral portion is clamped between the lower section 19b of the diaphragm case and a block or flange element 42 which is secured to the lower end of the diaphragm case by bolts 42a. It is noted that the lower stabilizing diaphragm closes the lower chamber C which is formed within the diaphragm case.

A valve seat 43 is mounted in the lower end of the tubular sleeve 29, and the upper ball or valve element 44 of the pilot valve is adapted to engage this seat. The upper ball 44 has connection through a stem 45 with a lower ball or valve element 46 and the lower ball is arranged to engage the upper end of a valve seat member 47. The valve seat is threaded axially within the block 42 and has an axial vent passage 48 which is opened and closed by the lower ball. A light spring 49 which engages the upper ball 44 of the pilot valve constantly urges the pilot valve in a downward direction.

When the pilot valve is in the position shown in Figure 1 with the upper ball seated, any flow through the tubular sleeve 29 and the passage 30 of the stem is shut off; however, when the upper ball is unseated from the seat member 43, pressure from the upper chamber D of the diaphragm case may flow through the opening 32 in the collar 23, then into the passage 30 and downwardly past the upper ball of the pilot valve. This pressure may then enter a chamber F which is formed within the upper portion of the block 42 and from this chamber may flow through a passage 50 to a conductor 51 connected with the passage. The opposite end of this conductor has connection with an inlet 17a of the chamber 17 above the motor valve diaphragm 15. It will thus be apparent that when the upper ball 44 of the pilot valve is unseated, pressure from the chamber D above the operating diaphragm 20 may be conducted to the operating chamber 17 of the motor valve.

The conductor 51 has a T connection 52 and an equalizing line 53 has one end thereof connected with this T. The opposite end of the equalizing line connects to a radial port 54 in the bonnet 26 whereby pressure may be conducted into the interior of the bonnet to act against the upper end of the upper stabilizing diaphragm. The under side of the lower stabilizing diaphragm 41 is exposed to this same pressure within the chamber F and the stabilizing diaphragms 41 and 27 of substantially the same cross-sectional area. Thus, any effect of the pressure within chamber F and acting against the lower diaphragm is substantially balanced out by the same pressure acting against the upper stabilizing diaphragm 27.

As has been noted the pressure in the conductor 10 upstream of the valve 13 is conducted through line 18 to the under side of the operating diaphragm 20 and tends to move said diaphragm upwardly. This movement of the operating diaphragm 20 is resisted by a spring 55 which is confined within the bonnet and which has its lower end contacting a follower plate 56. The downward force of the spring is transmitted through the follower plate and through a bearing 57 directly to the flange closure and therefore to the pilot valve unit. An adjusting screw 58 threaded into the upper end of the bonnet facilitates proper adjustment of the spring so that any desired pressure may be balanced.

Assuming the apparatus shown in Figure 1 to be employed as a liquid level controller, the upstream side of the conductor 10 has connection with the lower end of a pressure vessel V as shown in Figure 4, while the line 34 which communicates with the upper chamber D of the diaphragm case 19 has connection with the upper portion of the vessel V. Through the conductor 10 and the pressure line 18 a communication is thereby established between the lower end of the vessel V and the under side of the operating diaphragm 20. The spring 55 within the bonnet is properly adjusted in accordance with the level of liquid which is to be maintained in the vessel V. The pressure resulting from the weight of the column of liquid plus the pressure within the vessel acts against the under side of the control diaphragm 20 while the upper side of the diaphragm is subjected only to the pressure in the vessel. By exposing both the upper and lower surfaces of the diaphragm 20 to the pressure within the vessel the effect of pressure changes which might occur within the vessel are nullified and the control diaphragm 20 is thereby actuated solely in accordance with the differential between the pressure exerted by the weight of the liquid and the pressure of the spring 55. Because pressure is available from the upper end of the vessel V the construction illustrated utilizes this pressure as the pilot or operating pressure which is ultimately conducted to the operating chamber 17 of the motor valve; however, if the pressure in vessel V is constant then it would be possible to employ an outside source of pilot operating pressure through the line 34.

With the spring 55 adjusted in a predetermined manner, said spring will hold the control diaphragm 20 in a downward position which, as explained, causes a seating of the lower ball 46 of the pilot valve and an unseating of the upper ball 44 of said valve whereby pressure is present within the chamber F and acts through line 51 upon the main valve diaphragm 15 to hold said valve closed. As the liquid level rises within the vessel V the pressure beneath the control diaphragm 20 is increased and the rising of the liquid level beyond the desired point moves the control diaphragm upwardly against tension of the spring 55. Upward movement of the control diaphragm moves the sleeve 29 of the pilot valve unit upwardly to cause seating of the upper ball 44 of the pilot valve and an unseating of the lower ball 46 of said valve. When this occurs, the chamber F is vented through the axial passage 48 in the valve seat 47 to atmosphere to produce a reduction in pressure in chamber F, whereby the pressure in the line 51 and chamber 17 of the main valve is reduced to cause upward movement of the main valve, thereby allowing some flow of fluid past the valve. This immediately results in a lowering of the pressure acting in chamber C below control diaphragm 20 and as the diaphragm moves downwardly the lower ball 46 of the pilot valve is re-seated, and if such downward movement is sufficient the upper ball 44 is again unseated. The unseating or opening of the upper ball 44 of the pilot valve admits pressure from the area D above the diaphragm 20 through the ports 31 and passage 30 of the stem, past the ball element 44 through chamber F and line 51 into the operating chamber 17 of the main valve to again build up pressure in this chamber. The building up of pressure in chamber 17 results in a closing of the main valve 13 to reduce or shut off flow past the main valve. As the main valve element moves toward its closed position pressure acting against the under side of control diaphragm 20 is increased to again move the diaphragm upwardly.

The upper and lower ends of the movable pilot valve unit are sealed off by the upper and lower stabilizing diaphragms 27 and 41 which provide an efficient seal with substantially little friction. As has been noted, it is intended that the diaphragms present the same effective cross-sectional area to the pressure present within the chamber F so that the upper diaphragm will balance out the effect of any variations in pressure upon the lower stabilizing diaphragm. However, since it is difficult from a practical standpoint to machine the various parts of the assembly to cause each of the diaphragms 27 and 41 to have exactly the same effective cross-sectional area the lower valve seat 47 has been made adjustable. By providing the adjustment of this valve seat the seat may be moved into proper position to compensate for slight variations in the effective areas in the two diaphragms. It will be clear that if equal pressures are acting upon the control diaphragm 20 and if the upper stabilizing diaphragm 27 is exactly equal in effective area to the lower stabilizing diaphragm, with these latter diaphragms exposed to identical pressure, the operating diaphragm will be exactly centered within the diaphragm case; however, if the stabilizing diaphragms are not exactly the same in effective area, the operating diaphragm 20 would be either above or below center within the case, and since the pilot valve assembly moves with the diaphragm 20 the lower valve seat 47 must be in proper relationship to the lower ball 46 of the pilot valve E. The adjustability of the valve member thus makes it possible to properly locate the seat in the event compensation is required. It is also noted that the seat may be adjusted in order to change the operation of the device from a throttling action of the pilot valve to a snap action.

In addition to the function of providing an effective seal with minimum frictional resistance, the diaphragms 27 and 41 function as a stabilizing means. This effect is produced by connecting the chamber F within which the lower stabilizer diaphragm 41 is exposed and the bonnet 26 within which the upper stabilizer diaphragm is exposed with the line 53 having a lesser cross-sectional area than either the chamber or the bonnet. The line 53 thus functions as a restriction to the flow between the chamber F and the bonnet. Assuming that a pressure increase occurs in the line 18 this increase will be due to a lowering of the main valve element 13 which is a direct result of an increase in the pressure in the motor valve chamber 17 and in the chamber F below the pilot valve assembly. As the pressure increase in line 18 begins to move the main control diaphragm 20 upwardly, the lower ball of the pilot valve is unseated a further distance to increase the venting from the chamber F. Since the lower stabilizer diaphragm is exposed to the pressure in chamber F, a more rapid pressure drop will occur in chamber F than will occur within the interior of the bonnet 26 because of the restriction to flow created by the line 53. This momentarily unbalances the two stabilizing diaphragms 27 and 41 and in effect a slightly greater pressure is acting on the upper surface of diaphragm 27 than is acting on the lower surface of diaphragm 41. This unbalance is in a direction which would tend to urge the pilot valve unit in a downward direction in opposition to the pressure acting below the main control diaphragm. It is thus evident that a damping effect is produced.

If the pressure in line 18 decreases, the lower ball 46 of the pilot is seated, while the upper ball is unseated to admit pressure from chamber D into chamber F. Because the lower stabilizer diaphragm is exposed in chamber F the pressure increase acting on this diaphragm will be more rapid than the pressure increase acting on the upper stabilizer diaphragm 27, this also being caused by the restricted line 53. The momentary unbalance thus created on the diaphragms 27 and 41 will cause an upward force to be exerted by diaphragm 41 in opposition to the reducing pressure in line 18. This operation of the two diaphragms has been found to stabilize or dampen the action of the main control diaphragm whereby extremely sensitive and accurate control may be had without any "hunting" of the main valve element 13.

As above described, the apparatus is applicable for accurately controlling the liquid level within a pressure vessel but said apparatus may also be employed as a back pressure regulator to maintain the desired pressure in the conductor 10 upstream of the main valve element 13. When operating as a back pressure regulator, the conductor 34 is omitted and a vent plug 60, as shown in Figure 6, is substituted therefor. In addition the plug 39 which normally closes the opening 38 provided in the annular housing 37 surrounding the sleeve 36 is removed, and this plug is placed in the opening 32 in the upstanding collar 23 of the follower plate 22. With this arrangement the area or chamber D above the diaphragm is closed off from the passage 30 in the stem 28, and this area or chamber is open to atmosphere through the plug 60. At the same time the chamber or area C below the control diaphragm 20 is placed into communication with the bore of the sleeve 29 through the opening 38.

The operation of the device is the same as has been heretofore described with the pressure to be controlled being conducted through the line 18 to the chamber C below the control diaphragm 20. As this pressure increases the diaphragm moves upwardly against the tension of the spring 55, and this causes a seating of the upper ball 44 of the pilot valve E and an unseating of the lower ball 46 of said pilot valve, thereby venting operating pressure from the chamber 17 to allow an opening of the main valve element 13. Such opening of the main valve element results in a reduction in pressure in the line 18 and chamber C so that the spring 55 can again move the control diaphragm 20 downwardly. Such downward movement again seats the lower ball 46 to close the vent passage 48 and if the movement is sufficient the seat 43 is moved away from the upper ball 44 of the pilot valve; if this occurs, the pressure within the chamber C below the control diaphragm is conducted past the pilot valve, through the line 51 to chamber 17 to increase the pressure in that chamber and thereby move the main valve element 13 toward a closed position to again build up the pressure in the conductor 10 upstream of the valve. In this case the operating pressure in the chamber C is provided from the conductor 10 and is controlled in accordance with the differential between this pressure and the adjustment of the spring 55.

In Figures 1 to 3 the control assembly B has been illustrated as a unitary structure separate from the motor valve A but it is within the scope of the present invention to connect these units together as a single apparatus. In Figure 6 the invention is shown as a back pressure regulating device with a separate pilot supply, while in Figure 7 the apparatus is illustrated as a pressure reducing regulator. Referring to Figure 6 the control assembly B is constructed in substantially the same manner as shown in Figure 1 except that the vent plug 60 is substituted for the pressure line 34 and the body or block 42 is omitted. In place of the block 42 an adapter body 61 is connected to the upper end of the motor valve A being bolted to the upper end thereof in place of the upper section of the diaphragm case. The adapter block 61 is also secured by bolts 62 to the under side of the lower section 19b of the assembly B. Within the lower portion of the adapter block a chamber G is formed, and this chamber functions in the same manner as the chamber 17 of the motor valve in that the upper surface of the motor valve diaphragm 15 is exposed therein. In the form shown in Figure 6 the main valve 13 is normally urged toward an upper or open position by a spring 63 and the pressure in chamber G opposes this spring to close the valve.

Within the upper portion of the adapter block a chamber H is formed, and this chamber is comparable to the chamber F of the first form, said chamber communicating with the bore of the tubular sleeve 29 of the pilot valve unit. An axial recess 64 is formed in the bottom of the chamber H and a valve seat 47a is mounted in the upper portion of this recess. A lateral passage 65 extends from the recess and the outer end of this passage is connected to a pilot supply line or conductor 66. A port 67 which is normally closed by a plug 68 extends from the passage 65 and when the plug is removed establishes communication between the passage 65 and the operating chamber G.

Extending from one side of the chamber H below the pilot valve unit is an angular passage 69 which communicates with the interior of the chamber G. A lateral passage 70 extending from the angular passage 69 has connection with one end of an equalizing line 53a which substitutes for the equalizing line 53 of the first form. The upper end of the equalizing line is connected in the radial opening 54 of the bonnet 26.

In this form of the unit the pilot valve is reversed with the larger ball 44 disposed within the recess 64 and adapted to engage the lower end of the valve seat 47a. The stem 45 extends through the valve seat and the smaller ball 46 of the valve unit is adapted to seat on the lower end of the valve seat 43 of the pilot valve unit.

In operation of this form, pilot pressure is supplied through the line 66 and is present in the passage 65 and recess 64. The pilot pressure is present in the chamber G and is normally urging the main valve 13 toward a seated position. Any increase in pressure in the line 10 is transmitted through the line 18 to the chamber C below the main operating diaphragm 20 of the assembly B, whereby upward movement of the diaphragm and the pilot valve unit is effected. As the upper valve seat 43 moves upwardly away from the ball 46, pressure within the chamber G and acting on the motor valve diaphragm 15 may be vented upwardly through the tubular sleeve 29, passage 30 and through the upper chamber D to atmosphere through the plug 60. As pressure decreases in the chamber G the spring 63 opens the main valve element 13 a greater distance with the result that there is a reduction in pressure in the upstream side of the line 10.

As the upstream pressure reduces, the main control diaphragm 20 moves downwardly and engages the ball 46 of the pilot valve E to close the tubular sleeve 29; any continued downward movement of the diaphragm 20 results in unseating the ball 44 of the pilot valve E to admit additional pilot pressure from line 66 into chamber G. Such increase will, of course, react to move the main valve element 13 toward its closed position. It will be evident that the stabilizing diaphragms 27 and 41 function in the same manner in the assembly B as has been hereinbefore described. When the chamber G is first vented the reduction of pressure adjacent the lower stabilizer diaphragm 41 will be normally greater than the reduction of pressure acting upon the upper stabilizer diaphragm so that the unbalance is utilized to resist continued movement of the main control diaphragm. Similarly, when pressure is admitted to chamber G the pressure increase acting against the lower stabilizing diaphragm is momentarily greater than the increase in pressure against the upper stabilizing diaphragm and again the unbalance is utilized to dampen the movement of the main control diaphragm.

In Figure 7 still another modification of the apparatus is shown wherein the control assembly B and the motor valve A are combined in a manner to provide a pressure reducing regulator. The construction is substantially identical to the apparatus shown in Figure 6 with the pilot pressure being supplied through the line 66 directly through the passage 65. In this form the plug 68 is removed from the port 67 and is placed within the lower end of the angular passage 69. Thus, a fixed pilot supply is constantly directed to the chamber G.

Since downstream pressure is to be controlled a line 18a connects the chamber C below the operating diaphragm 20 with the conductor 10 downstream of the main valve element 13. Instead of venting the under side of the operating diaphragm 15 of the motor valve, as is the case in Figure 6, the radial opening 17b which is normally a vent is connected through a line 71 with the equalizing line 53a.

The operation of this form is believed to be obvious. The fixed pilot pressure normally maintains the main valve element 13 closed, and the downstream pressure is acting in the chamber C below the main control diaphragm. If the downstream pressure decreases below the desired amount the pilot valve assembly moves downwardly to unseat the ball 44 of the pilot valve and to thereby direct pilot pressure through the passage 70, line 71 and into the area below the operating diaphragm 15 of the motor valve. This increased pressure moves the motor valve upwardly to open the main valve and allow an increase in downstream pressure. On the other hand, if the downstream pressure increases beyond the desired point, the control diaphragm C is moved upwardly to unseat the ball 46 of the pilot valve and allow a venting of the area or chamber below the operating diaphragm 15 of the main valve, thereby moving the main valve element 13 toward closing position. In this form of the invention the pilot pressure acting against the upper end of the diaphragm 15 of the main valve is constant and the area below the diaphragm is either vented or additional pressure added in accordance with conditions.

In all forms of the invention, the upper and lower stabilizing diaphragms 27 and 41 function to stabilize or dampen the movement of the control diaphragm 20 to provide for the efficient and sensitive control. In addition the diaphragms 27 and 41 provide a very effective seal about the movable pilot valve unit with a minimum frictional resistance. Since the two diaphragms 27 and 41 are of substantially the same cross-sectional area the upper diaphragm nullifies any effect which the exposing of the lower diaphragm to operating pressure may have in the overall operation of the device. The particular arrangement not only provides an extremely sensitive control assembly but said assembly readily lends itself to association with a motor valve in a number of different ways to provide various types of apparatus for accomplishing different regulating purposes.

Having described the invention, I claim:

1. A control assembly for controlling the pressure in the motor chamber of a motor valve and including, a housing, a control diaphragm mounted within the housing, means for establishing communication between the housing and the motor chamber of the motor valve, means for conducting a variable pressure to one side of the control diaphragm to impart movement thereto in accordance with variations in said pressure, a movable pilot valve unit including a double valve element mounted within the housing and connected with the control diaphragm for controlling the admission of an operating pressure to the communication establishing means and to the motor chamber of the motor valve, said pilot valve unit also controlling the venting of the operating pressure from the motor chamber to atmosphere, flexible annular sealing means surrounding the lower portion of the pilot valve unit within the housing for sealing off between the unit and housing, said sealing means having its lower side exposed to the operating pressure acting upon the motor of the motor valve, and means also secured to the pilot valve unit for balancing out the effect of the operating pressure acting against the sealing means.

2. The combination as set forth in claim 1, wherein the flexible sealing means is a sealing diaphragm which spans the annular space between the pilot valve unit and the wall of the housing, and also wherein the means for balancing the effect of the operating pressure upon said diaphragm is a second sealing diaphragm between the upper portion of the pilot valve unit and the housing, said second diaphragm being of the same cross-sectional area as the sealing diaphragm and having its upper surface exposed to the operating pressure through a restricted passage, whereby said diaphragms function as a stabilizing means to stabilize the operation of the control diaphragm.

3. A control assembly for controlling the pressure in the motor chamber of a motor valve and including, a housing, a control diaphragm within the housing, said housing having a chamber, means for conducting a pressure fluid from a pressure fluid source to said chamber, means establishing communication between the chamber and the motor chamber of the motor valve, a vent passage extending from the chamber, a pilot valve unit also within the housing adjacent the chamber and secured to and actuated by the diaphragm, said pilot valve unit being movable with the diaphragm for controlling the admission of pressure into the chamber from the pressure fluid source and also the release of pressure from the chamber through the vent passage to atmosphere, conducting means for supplying an operating pressure to one side of the control diaphragm, sealing means around the lower portion of the pilot valve unit for sealing between the valve unit and housing and exposed to the pressure within the motor chamber of the motor valve, and means connected with the diaphragm and pilot valve unit for nullifying the effect of the pressure acting against the sealing means, said control diaphragm and pilot valve unit being movable in accordance with variations in the operating pressure acting against one side of the control diaphragm.

4. A control assembly as set forth in claim 3 wherein the means for nullifying the effect of the pressure acting upon the sealing means is a second sealing means around the upper end of the pilot valve unit for sealing between said unit and the housing, said second sealing means having substantially the same cross-sectional area as the first sealing means and also being exposed to the pressure within the motor chamber of the motor valve.

5. A control assembly as set forth in claim 3, wherein the sealing means is a flexible sealing diaphragm disposed between the lower end of the pilot valve assembly and the housing and wherein the means for nullifying the effect of the pressure acting upon said diaphragm is a second flexible sealing diaphragm having the same cross-sectional area and disposed between the upper end of the pilot valve assembly and the housing and also exposed to the pressure within the motor chamber of the motor valve through a restricted conduit, whereby said flexible diaphragms also function as a stabilizing means.

6. A control assembly adapted to be associated with a motor valve to produce a regulating apparatus and comprising, a housing, a control diaphragm extending across said housing, a pilot valve unit secured axially to the control diaphragm and movable by and with said diaphragm, said housing having a chamber adjacent the pilot valve unit, a fluid pressure supply line having communication with the chamber, an outlet conductor communicating with the chamber, a vent passage to atmosphere also communicating with said chamber, said pilot valve unit including a tubular sleeve the bore of which forms a flow passage to or from the chamber, a valve seat within the sleeve, a second valve seat within the chamber below the tubular sleeve, the pilot valve unit also including a pair of connected valve elements which are movable independently within limits relative to the sleeve, one of said valve elements co-acting with the annular valve seat within the sleeve and the other of said elements coacting with the seat within the chamber, whereby said valve elements control the admission of pressure into and the venting of pressure from the chamber past said valve seats, a lower sealing and stabilizing diaphragm surrounding the lower end of the pilot valve unit and having its underside exposed within the chamber for sealing off between the tubular sleeve and the wall of the housing, an upper sealing and stabilizing diaphragm between the upper end of the pilot valve unit and the wall of the housing and having substantially the same cross-sectional area as the lower sealing and stabilizing diaphragm, and means establishing communication between the chamber and the area above the upper side of the upper sealing and stabilizing diaphragm to expose said upper side of the upper diaphragm to the same pressure which is acting on the underside of the lower diaphragm.

7. A control assembly as set forth in claim 6, wherein the means establishing communication between the chamber and the upper side of the upper sealing and stabilizing diaphragm is a conduit of restricted cross-section as compared to the volume of the chamber and the volume of the area above said upper diaphragm.

8. A control assembly as set forth in claim 6, together with a spring means in the upper portion of the housing acting in one direction on the control diaphragm, and means for exposing the opposite side of the control diaphragm to a variable pressure, whereby the control diaphragm and pilot valve unit is actuated by the differential between said pressure and the spring means.

9. A control assembly as set forth in claim 6, wherein the means establishing communication between the chamber and the upper side of the upper sealing and stabilizing diaphragm is a conduit of restricted cross-section as compared to the volume of the chamber and the volume of the area above said upper diaphragm, a spring means in the upper portion of the housing acting in one direction on the control diaphragm, and means for exposing the opposite side of the control diaphragm to a variable pressure, whereby the control diaphragm and pilot valve unit is actuated by the differential between said pressure and the spring means.

10. A control assembly as set forth in claim 6, wherein the vent passage has a valve seat therein which is engageable by one of the valve elements of the pilot valve, and means for adjustably mounting said valve seat, whereby the position of said seat relative to its coacting valve element may be varied.

References Cited in the file of this patent

UNITED STATES PATENTS

| | | |
|---|---|---|
| 698,703 | Gulland | Apr. 29, 1902 |
| 1,851,422 | Durando | Mar. 29, 1932 |
| 2,067,510 | Spence | Jan. 12, 1937 |
| 2,146,273 | Smith | Feb. 7, 1939 |
| 2,196,279 | Thomas | Apr. 9, 1940 |
| 2,257,171 | King | Sept. 30, 1941 |
| 2,446,051 | Leslie | July 27, 1948 |